(12) United States Patent
Nack et al.

(10) Patent No.: US 12,232,508 B2
(45) Date of Patent: Feb. 25, 2025

(54) METHOD FOR BINDING PARTICULATES TO A SNACK BASE

(75) Inventors: Thomas J. Nack, Hopkins, MN (US); Tanya Schmidt, Maple Grove, MN (US)

(73) Assignee: General Mills, Inc., Minneapolis, MN (US)

( * ) Notice: Subject to any disclaimer, the term of this patent is extended or adjusted under 35 U.S.C. 154(b) by 3489 days.

(21) Appl. No.: 13/434,494

(22) Filed: Mar. 29, 2012

(65) Prior Publication Data

US 2012/0225165 A1 Sep. 6, 2012

Related U.S. Application Data

(63) Continuation-in-part of application No. 12/837,607, filed on Jul. 16, 2010, now abandoned.

(60) Provisional application No. 61/227,098, filed on Jul. 21, 2009.

(51) Int. Cl.

| | |
|---|---|
| *A23G 3/34* | (2006.01) |
| *A21D 13/24* | (2017.01) |
| *A21D 13/28* | (2017.01) |
| *A21D 15/08* | (2006.01) |
| *A23G 1/30* | (2006.01) |
| *A23G 3/54* | (2006.01) |
| *A23L 7/122* | (2016.01) |
| *A23L 7/126* | (2016.01) |
| *A23L 25/10* | (2016.01) |
| *A23P 20/10* | (2016.01) |
| *A23P 20/12* | (2016.01) |

(52) U.S. Cl.
CPC ........... *A23G 3/0085* (2013.01); *A21D 13/24* (2017.01); *A21D 13/28* (2017.01); *A21D 15/08* (2013.01); *A23G 1/305* (2013.01); *A23G 3/0089* (2013.01); *A23G 3/343* (2013.01); *A23G 3/54* (2013.01); *A23L 7/122* (2016.08); *A23L 7/126* (2016.08); *A23L 25/10* (2016.08); *A23P 20/11* (2016.08); *A23P 20/12* (2016.08)

(58) Field of Classification Search
CPC .......... A23G 3/54; A23G 9/322; A23G 3/343; A23G 3/0085
USPC ........................................................ 426/306
See application file for complete search history.

(56) References Cited

U.S. PATENT DOCUMENTS

| | | |
|---|---|---|
| 2,739,896 A | 3/1956 | Block |
| D202,609 S | 10/1965 | Weiss et al. |
| 3,671,267 A * | 6/1972 | Gooding et al. ........ A23L 25/10 426/633 |
| 3,703,379 A | 11/1972 | Cummisford et al. |
| 3,901,977 A | 8/1975 | Rebane |
| 4,055,669 A * | 10/1977 | Kelly ...................... A23L 7/126 426/656 |
| 4,210,025 A | 7/1980 | Bimond et al. |
| 4,275,083 A | 6/1981 | Colten et al. |
| 4,647,463 A | 3/1987 | Hoover |
| 4,812,318 A | 3/1989 | Finkel |
| 4,910,031 A | 3/1990 | Budd et al. |
| 4,961,943 A * | 10/1990 | Blanthorn et al. ............ 426/102 |
| 5,120,566 A | 6/1992 | Baba et al. |
| D339,443 S | 9/1993 | Bielinski et al. |
| D339,444 S | 9/1993 | Evenson et al. |
| D341,469 S | 11/1993 | Evenson et al. |
| 5,306,192 A | 4/1994 | Caveza et al. |
| 5,391,383 A * | 2/1995 | Sullivan et al. ................ 426/99 |
| D368,791 S | 4/1996 | Laughlin |
| D372,352 S | 8/1996 | Laughlin |
| D373,671 S | 9/1996 | Laughlin et al. |
| D384,785 S | 10/1997 | Laughlin |
| 5,846,587 A | 12/1998 | Kelly et al. |
| D403,485 S | 1/1999 | Clanton et al. |
| 5,964,146 A | 10/1999 | Kelly et al. |
| 5,968,572 A * | 10/1999 | Behnke et al. ................ 426/302 |
| 6,194,014 B1 | 2/2001 | Busse et al. |
| 6,217,921 B1 | 4/2001 | Lanner et al. |
| 6,500,474 B2 * | 12/2002 | Cross ...................... A23G 1/305 426/289 |
| 6,592,920 B2 * | 7/2003 | Charles ................... A23P 20/18 118/24 |
| 6,689,406 B2 | 2/2004 | Kuehl et al. |
| 6,756,070 B1 | 6/2004 | Milley |
| 7,022,356 B2 | 4/2006 | Schmidt |
| 7,029,714 B2 | 4/2006 | Mihalos et al. |
| 7,144,595 B2 | 12/2006 | Perlman et al. |

(Continued)

FOREIGN PATENT DOCUMENTS

| | | | |
|---|---|---|---|
| BE | 894208 | 2/1983 | |
| EP | 0 714 608 | * 5/1996 | ............... A23L 1/00 |

(Continued)

OTHER PUBLICATIONS

Faith58, Very Addicting Chex Mix, http://www.food.com/recipe/very-addicting-chex-mix-134290, Food.com, Jul. 2007.*
US Standards for Grades of Shelled Pecans, USDA, 1969, reprinted 1997 accessed at http://ucfoodsafety.ucdavis.edu/files/175742.pdf.*
Anon, http://www.cookitsimply.com/measurements/, accessed at http://www.cookitsimply.com/measurements/ on Aug. 14, 2019.*
Powder Sugar accessed at https://www.sympatec.com/en/applications/sugar/ on Aug. 14, 2019.*
M&M Megas https://www.latimes.com/food/dailydish/la-dd-mms-mega-three-times-chocolate-hits-stores-20140411-story.html., 2014.*

(Continued)

*Primary Examiner* — Donald R Spamer
*Assistant Examiner* — Philip A Dubois
(74) *Attorney, Agent, or Firm* — Jordan IP Law, LLC; Rachel A. Kahler

(57) ABSTRACT

The invention provides novel products and methods. The composition of the invention is a coated food product generally comprising: a product base, a slurry coating and a dry set coating. Specifically, there is disclosed a food product with a cookie and cream coating and a method of coating a food product with a cookie and cream coating.

22 Claims, No Drawings

(56) References Cited

U.S. PATENT DOCUMENTS

| | | |
|---|---|---|
| 7,147,882 B2 | 12/2006 | Girsh |
| 7,575,768 B2 | 8/2009 | Perlman et al. |
| 7,601,509 B2 | 10/2009 | Power |
| 7,763,298 B2 | 7/2010 | Archibald et al. |
| 7,803,418 B2 | 9/2010 | Garter et al. |
| 7,919,134 B2 | 4/2011 | Froseth et al. |
| 7,968,130 B2 | 6/2011 | Walter et al. |
| 7,968,131 B2 | 6/2011 | Walter et al. |
| 8,029,835 B2 | 10/2011 | Parsons et al. |
| 8,043,643 B1 | 10/2011 | Stevens et al. |
| 8,119,174 B2 | 2/2012 | Green et al. |
| 8,580,327 B2 | 11/2013 | Cross et al. |
| 2003/0198712 A1 | 10/2003 | Klug et al. |
| 2004/0121048 A1 | 6/2004 | Kretchman |
| 2005/0181000 A1 | 8/2005 | Lundquist et al. |
| 2005/0255218 A1* | 11/2005 | Green ............... A23L 7/122 426/619 |
| 2006/0147585 A1 | 7/2006 | Winckelmann et al. |
| 2007/0148324 A1 | 6/2007 | Lin et al. |
| 2007/0196560 A1 | 8/2007 | Ayoub |
| 2008/0008790 A1* | 1/2008 | Jensen et al. ............... 426/97 |
| 2008/0020120 A1 | 1/2008 | O'Donnell Kiely |
| 2008/0050605 A1 | 2/2008 | Rapp et al. |
| 2008/0102163 A1 | 5/2008 | O'Toole |
| 2008/0248183 A1* | 10/2008 | Brown ............... A23G 1/32 426/588 |
| 2008/0317907 A1 | 12/2008 | Thomas et al. |
| 2009/0130265 A1 | 5/2009 | Leas et al. |
| 2011/0014333 A1 | 1/2011 | Wright |
| 2011/0020502 A1 | 1/2011 | Nack et al. |
| 2011/0183046 A1 | 7/2011 | Nack et al. |

FOREIGN PATENT DOCUMENTS

| | | |
|---|---|---|
| EP | 0 654 223 B1 | 3/2001 |
| EP | 1839496 | 10/2007 |
| GB | 1 484 518 | 9/1977 |
| JP | 2001/294891 | 10/2001 |
| JP | 2002/003376 | 1/2002 |
| JP | 2007/284458 | 11/2007 |
| WO | WO 2002/102169 | 12/2002 |
| WO | WO 2004/077964 | 9/2004 |
| WO | WO 2006/127599 | 11/2006 |
| WO | WO 2007/008385 A1 | 1/2007 |
| WO | WO 2007/070616 | 6/2007 |
| WO | WO 2011/011271 A1 | 1/2011 |
| WO | WO 2011/090811 A1 | 7/2011 |

OTHER PUBLICATIONS

Chex Mix Weight accessed at https://www.traditionaloven.com/foods/exchange/cup/g-gram/snacks-general-mills-chex-mix-traditional-flavor.html 2019.*

Chocolate chip weight, accessed at http://www.cookitsimply.com/measurements/cups/chocolate-chips-0070-085q.html2003.*

Peanute butter http://www.cookitsimply.com/measurements/cups/peanut-butter-0060-028q3.html 2003.*

Butter http://www.cookitsimply.com/measurements/cups/butter-0060-021i2.html 2003.*

Vanilla weight accessed at https://www.traditionaloven.com/foods/multi-units-converter/vanilla-extract.html 2019.*

Cosby, Addictive Chex Mix, http://www.food.com/recipe/addictive-chex-mix-277562?scaleto=18.0&st=null&mode=metric, Food.com, Nov. 2008.*

Brown Sugar Converstion Amount, acceesed at https://www.traditionaloven.com/culinary-arts/sugars/brown-sugar/convert-milliliter-ml-to-gram-g-brown-sugar.html, on May 23, 2020.*

Salt Converstion Amount, accessed at https://www.traditionaloven.com/culinary-arts/cooking/table-salt/convert-milliliter-ml-to-gram-g.html, May 23, 2020.*

Pecan Converstion Amount, accessed at http://convert-to.com/621/pecan-nuts-halves-conversion-with-nutritional-facts-table-listed.html, May 23, 2020.*

Converstion Amounts, https://www.aqua-calc.com/calculate/food-volume-to-weight, accessed on May 23, 2020.*

Conversion Amount Light Corn Syrup, accessed at http://convert-to.com/574/light-corn-syrup-measures-amounts-conversion-and-nutrition-facts-information.html, accesed on May 23, 2020.*

Conversion Amounts of Butter, https://www.traditionaloven.com/culinary-arts/cooking/butter/convert-milliliter-ml-to-gram-g.html accessed on May 23, 2020.*

Conversion Amounts of Margarine, https://www.traditionaloven.com/culinary-arts/cooking/margarine/convert-gram-g-of-margarine-to-milliliter-ml.html, accessed on May 23, 2020.*

Anon, Chocolate Wheat Cereal, Taste of Home, accessed at www.tasteofhome.com/recipes/chocolate-wheat-cereal-snacks/, Nov. 2008 (Anon).*

Aqua Calc, Shredded Wheat accessed at https://www.aqua-calc.com/calculate/food-volume-to-weight/substance/frosted-blank-shredded-blank-wheat-coma-and-blank-frosted-coma-and-blank-upc-column--blank-098487952356 (Shredded Wheat Pieces).*

Peanut Butter accessed at https://www.aqua-calc.com/calculate/food-volume-to-weight/substance/creamy-blank-peanut-blank-butter-coma-and-blank-upc-column--blank-837991611188 (Peanut Butter).*

Chocolate chips https://www.aqua-calc.com/calculate/food-volume-to-weight/substance/chocolate-blank-chips-coma-and-blank-semisweet-blank-morsels-coma-and-blank-upc-column--blank-725439102193 (Chocolate Chips).*

How Much Does a Cup of Powdered Sugar Weigh? accessed at https://whatthingsweigh.com/how-much-does-a-cup-of-powdered-sugar- weigh/ (Confectioner's Sugar).*

Sweet Minglers, Old Recipe Book, Recipe from 1998 Platte SD Hospital Recipe Book accessed at http://oldrecipebook.com/holidaysnacks.shtml.

Sugar Particle Size. Biscuit Expert. [Online]. Downloaded from <URL: http://www.biscuitexpert.com/default.asp?siteid=&p=detay&id=37> 1 pg, Aug. 1, 2012.

Trans fat: avoid this cholesterol double whammy. CNN.com. [Online]. Dec. 21, 2006. Downloaded from <URL: http://www-cgi.cnn.com/HEALTH/library/CL/00032.html> 4 pgs.

Anonymous, "*How to Make Monkey Munch*", Retrieved from the Internet: http://web.archive.org/web/20090530025735/http://www.wikihow.com/Make-Monkey-Munch, Sep. 25, 2013.

Chex Muddy Buddies. [Online]. Apr. 20, 2008. Downloaded from: <URL: http://web.archive.org/web/20080420032201/http://www.grouprecipes.com/36219/chex-muddy-buddies.html> 2 pgs, Apr. 2008.

Chocolate. Baking Management. Boost taste and sales with Chocolate. [Online]. Aug. 1, 2006. Downloaded from <URL: http://baking-management.com/ingredients/bm_imp_14105/> 3 pgs, Aug. 2006.

Rattray, "*Ritz Cracker Treats with Chocolate Peanut Butter Coating*", retrieved from the Internet: http://web.archive.org/web/20081216131120/http://southernfood.about.com/od/halloween/r/bl60926b.htm, Sep. 25, 2013.

Anonymous, "*Chocolate Peanut Butter Puppy Chow*", Retrieved from the Internet: http://www.cpbgallery.com/2008/07/06/chocolate-peanut-butter-puppy-chow, Jul. 6, 2008.

* cited by examiner

METHOD FOR BINDING PARTICULATES TO A SNACK BASE

This application is a continuation-in-part of application Ser. No. 12/837,607, which is Pre-grant publication US 2011/0020502 and is hereby incorporated by reference in its entirety.

FIELD OF THE INVENTION

The invention generally relates to a method of binding particulates to a snack base using a fat-based flavored compound coating and specific processing procedures.

BACKGROUND

A wide variety of food products comprise a base food or comestible having a topical coating to improve the taste, appearance, nutrition, texture, stability or other feature of the product. Especially desirable and limited in use are topical coatings that are commonly associated with snacks, such as cookie bits.

A wide variety of food products comprise a base food or comestible having a topical coating to improve the taste, appearance, nutrition, texture, stability, improved shelf-life or other feature of the product. In particular, a wide variety of snack food products comprise a base food such as a fried expanded piece fabricated from a cooked cereal dough and having a topically applied seasoning coating. In other variations, a powder seasoning and/or dry set material can be combined with a compound fat coating to provide a dual textured seasoned topical coating to a snack food product base. One example of a dual-textured coating is found in US Published Application 2011/0020502 A1 which is incorporated herein by reference in its entirety. One example of a slurry coating composition and methods of preparation is found in US Published Application 2011/0183046 A1 which is incorporated herein by reference in its entirety.

One problem long associated with many varieties of snack foods is the tendency of topically applied substances, such as seasonings and decorations (often referred to as "toppings"), to become separated from the base portion of the food product. Such separation can occur, for example, during the preparation, packaging or transit of the food item. Separation during preparation or packaging can result in increased production costs due to higher seasoning overuse and can complicate processing. Separation during packaging, or transit can result in loose toppings becoming collected at the bottom of the package, while the product reaching the consumer has less than the desired complement of topping thereon (See, for example, U.S. Pat. No. 4,910, 031 Topped Savory Snack Product, issued Mar. 20, 1990).

A further type of undesirable separation of topping from snack food items occurs when the product is eaten. Frequently, the topping adheres to the fingers of the consumer. This phenomenon is referred to by the food science industry as "rub-off or "fingerprinting." Rub-off of toppings from any snack food item is undesirable because the product reaching the mouth of the consumer includes a reduced amount of the toppings. Rub-off of toppings, especially powdery or oil or fat-based toppings, is undesirable as it can leave a residue upon the fingers of the consumer. Accordingly, the need exists for reducing all types of topping separation from snack food items prior to being consumed.

Typically, sugar-based or fat-based sugar coatings are applied using well known panning operations. However, panning operations, while effective, are relatively expensive operations having lengthy batch application durations and low capacities (for given capital investments). Panning applications are also limited in the ability to add particulates to the coated snack base. One example of a panning application is found in US Published Application 2008/0050605 A1, which is incorporated herein by reference in its entirety. In view of the aforementioned coating processes, there is need for a continuous process to bind particulates to a food product.

SUMMARY

Surprisingly, a continuous process has been found and is described herein where binding particulates can be used for snack food products when used with a dry set material and slurry coating in sufficient quantities.

Although the scope of the invention is provided by the claims hereby appended, it should be understood that variations of the particular embodiments described herein incorporating the principles of the invention will occur to those of ordinary skill in the art and yet will be within the scope of the appended claims.

DETAILED DESCRIPTION

The invention provides a novel product and method of coating and binding particulates to a food product. In various example embodiments, a food product with a cookie and cream coating and a method of coating a food product with a cookie and cream coating are provided.

An example composition of the invention is a coated food product generally comprising ingredients such as a product base, a slurry coating and a dry set coating. The dry-set coating comprises a dry setting material and particulates. Each ingredient is herein described in detail.

An example product base of the invention can be any of a typical snack food base pieces or any other product of a similar nature. It can be in the form of a chip, a tube, a ball, a curl or any of the other familiar snack forms. While generally a base food piece is cereal or farinaceous in nature such as corn, wheat, rice, barley and the like, the invention is not limited thereto but includes any similar base food piece derived from protein, starch, fiber or combinations thereof, with or without fat and other ingredients. Many of these base pieces are made by forming a dough, either cooked or uncooked, and shaping the dough and finally toasting, baking or deep fat frying a piece to provide the finished product.

In variations of the invention, a base piece is a puffed or expanded piece fabricated from a cooked cereal dough by deep fat frying. However, the base pieces can also be supplied by a wide variety of breakfast cereal pieces such as those in the form of flake, shreds, and biscuits and puffed pieces of various shapes and sizes, e.g., spheres, rings, letters, and/or figurines. In one embodiment, the base pieces are plain or uncoated. However, cereal base pieces having a pre-sweetener coating or vitamin slurry can also be utilized.

Mixtures of various base pieces are contemplated such as, for example, a mixture of two or more base flavors and/or shapes or sizes. Also, a food base can include other pieces such as nuts or nut pieces. In still other variations, a base can include small pretzel shapes or baked bread slices, or other non-sugar coated Ready-to-Eat (RTE) cereal pieces.

In one example embodiment, a product base comprises a hex lattice (RTE) cereal pieces (marketed under the Chex® brand). In a related embodiment, a product base comprises at least 30% to about 55% by weight of a coated food product.

A fat based compound coating ("slurry coating") typically includes fat, sugar, flavors (natural and/or synthetic), dairy components and emulsifiers. A slurry coating may also include fractionated palm kernel oil, non-fat dry milk, cocoa, cocoa powder and vanilla extract. A slurry provides a substrate for particulates to bind to a base material. A slurry can optionally include other minor ingredients to improve the color, flavor, texture or nutritional value of the herein described coated snack products. A slurry coating of the invention comprises between about 30% to about 50% by weight of a substantially coated food product. In one embodiment, a slurry coating comprises between about 35% to about 45% of a substantially coated food product. In another example embodiment, a slurry coating comprises between about 35% to about 40% of a substantially coated food product.

In various exemplary embodiments, a coating can additionally comprise a wide variety of adjuvant materials intended to improve the appearance, flavor and/or nutritional properties of the finished coated food products. Such adjuvant ingredients can include, for example, salt, minerals, vitamins, nutriceuticals or medicinals, colorants, preservatives, flavors and mixtures thereof. A precise ingredient concentration in the finished coated food product will vary in a manner known by one of ordinary skill in the art.

A dry set coating of the invention typically comprises at least one dry set material and/or at least one type of particulate. Dry set material provides stability to a slurry coating. In particular, a dry set material provides heat stability of a final coated food product. A dry set material is also economically advantageous as it provides a medium to adhere particulates to a slurry coated food product base.

An example embodiment of a dry set material of the invention include a wide variety of simple and/or complex carbohydrates with low to medium hygroscopicity values possessing a degree of sweetness (hereinafter "sugars"). Sugars can be of natural or synthetic origin and can comprise naturally occurring or man-made mixtures of sugars. Preferred sugars are fructose, sucrose, glucose, Shugarwhite, dextrose, Baker's Special Sugar, various seasoning blends and cocoa. In one embodiment, Shugarwhite is used as a dry set material ingredient. Shugarwhite is a powdered sugar ingredient available from General Mills, Inc.

In other related embodiments, a dry set materials can be used in full or partial substitution for the Shugarwhite. A setting sugar can be any dry powdered nutritive carbohydrate sweetening ingredient including simple sugars such as fructose and dextrose as well as compound sugars such as sucrose. Also useful herein are powdered forms of soluble fiber ingredients such as inulin (dextrose is not a source of fiber). Other sugars that work well are Bakers Special Sugar, powdered sugar, fructose and various blends of these sugars. Various seasoning blends can also be utilized.

In one example embodiment, a dry set material has a particle size of at most 500 micrometers. A dry set material over 500 micrometers is defined as a particulate of the dry set coating. In an embodiment, 90 percent of a dry set material is less than 100 micrometers. In another example embodiment, a dry set material comprises between about 0% to about 25% by weight of the coated food product. In a related embodiment, a dry set material comprises between about 10% to about 25% by weight of the substantially coated food product.

In various example embodiments, particulates of the invention may comprise cookies, wafers, biscuits, candies, nuts, toffee and crackers. The particulates of the invention may also comprise, cookie fines, candy pieces, confectionery sprinkles, fruit pieces, color seasonnettes, or combinations thereof. Color seasonnettes may comprise corn cereal and propylene glycol.

Particulates of the invention also provide a dual texture to the coating of a food product. Particulates may also enhance the overall appearance and taste of a coated food product. In one embodiment, the particulates have a particle size of at least 500 micrometers to about 5000 micrometers. In some example embodiments, about 50% of said particulates are less than 1000 micrometers. In some example embodiments, about 50% of said particulates are between 1000 to 2000 micrometers. In some example embodiments, about 95% of said particulates are less than 4000 micrometers. In one example embodiment, the particulates comprise at most about 25% by weight of the substantially coated food product. The particulate density is one factor in determining the weight percentage of particulates. In another example embodiment, low density particulates comprise about 1% to about 3% by weight of the substantially coated food product.

In various example embodiments, a preservative such as TBHQ (tertiary butylhydroquinone) can be added to prevent lipid oxidation in the coating and is a highly effective preservative for unsaturated vegetable oils and many edible animal fats for enhancing storage life. TBHQ does not cause discoloration, and does not change flavor or odor of the material it is added to. TBHQ can be combined with other preservatives such as butylated hydroxyanisole (BHA) or butylated hydroxytoluene (BHT). Other preservatives such as Butylated hydroxyanisole (BHA), calcium propionate, sodium nitrate, sodium nitrite, sulfur dioxide, sodium bisulfite, potassium hydrogen sulfite and disodium EDTA may also be added to a coated food product.

Improved methods for preparing a coated food product and binding particulates to a food product are also disclosed herein. In an example embodiment, a method of preparing a coated food product generally comprises: providing a product base, applying a slurry coating to an exterior surface and applying a dry set coating which comprises particulates and dry set material. Each of these method steps of preparation as well as end product descriptions are described in detail herein.

Prior to adding a slurry formulation to a product base, a product base temperature is determined to make sure that a product base is between about 60 degrees Fahrenheit and about 80 degrees Fahrenheit. This step provides for optimal slurry coverage during the coating process. Ambient cooling or heating should occur during the time interval before entering an enrober, tumbler and/or a rotating drum.

Once a product base is determined to be at an adequate temperature, a product base and slurry coating are added to a rotating drum or enrober and tumbled to achieve an even slurry coating distribution on a product base. In one example embodiment, an application of the hot slurry coating to a quantity of product base pieces provides a liquid hot slurry coated food base. In an example embodiment, a slurry is applied to a product base through a formulation capable of being sprayed onto a product base in an enrober/tumbler.

In one example embodiment, a slurry coating is applied to all or a substantial portion of an external surface of a product base. Excellent coverage is achieved through the use of a standard enrober. As an enrober turns, the base pieces are tumbled until the applied hot slurry coating evenly coats an exterior of the base pieces. In one embodiment, a slurry coating is applied though at least one spray nozzle. A slurry coating is applied at least 5 degrees above a melting point of a fat-based slurry coating.

In an example embodiment, a hot slurry coating is applied directly to a surface of a snack food base without an intervening or underlying base coat, such as an underlying sugar base coating. By applying a slurry coating directly to a product base surface, better adherence of a slurry coating and better appearance of a finished product can be obtained. A slurry coating is applied at least about 5 degrees above the melting point of the slurry coating. A slurry coating covers a substantial portion of the exterior. A substantial portion is defined as more of the exterior surface is covered with slurry coating compared to uncoated exterior portions.

An exterior surface is defined within the scope of the invention to describe the exterior portion that is desired to be coated. For instance, a substantially coated food product requiring a single-side being coated, then at least 50% of the exterior portion of a single-side would require a slurry coating. In another example embodiment, a exterior surface being the entire exterior portion of a product base, then at least 50% of the entire exterior portion would require a slurry coating. In another example embodiment, a slurry coating covers at least 80% of said product base exterior surface giving a homogeneous appearance. Parameters to achieve slurry coating on a variety of substantially coated food products are well known by one of ordinary skill in the art. A given percentage of a coating provides the least slurry coating coverage capable of providing a binding surface to apply the dry set coating.

Once a slurry coating is applied to a product base a step of applying dry set coating to a product base begins. In one example embodiment, a dry set coating comprises a dry set material and particulates.

In an example embodiment, about 100% of a dry set material is less than 500 micrometers. In one embodiment, about 90% of a dry set material is less than 100 micrometers. In one embodiment, a dry set material comprises between about 0% to about 25% by weight of a coated food product. In one embodiment, a dry set material comprises about 10-25% by weight of a substantially coated food product. A given percentage of a weight of a dry set material is dependant on a weight percent of particulates.

In various embodiments, a dry set material of the invention is determined based on an amount of particulates desired that will be over 500 micrometers. Additionally, particulates ranging in size and shape will also be factors in determining a weight percentage of a dry set material and particulates used.

In one embodiment, a weight ratio of product base to slurry to dry set coating is 2:2:1. In an alternative embodiment, a weight ratio of product base to slurry to dry set coating is 2.5:2:1. A weight ratio of product base to slurry to dry set coating is dependent at least in part on a density of a product base. Although not wanting to be bound by a particular theory, in certain embodiments the less dense a product base, more slurry will be required to cover the surface, and therefore more dry set coating will be needed.

Example Ratios for Base to Slurry to Dry Set Coating

|  | Base | Slurry | Dry Set Coating |
|---|---|---|---|
| Example 1 | 2.6 | 2.2 | 1 |
| Example 2 | 2.5 | 2.3 | 1 |
| Example 3 | 2.46 | 2.39 | 1 |

After the dry set coating is applied to a product base, a substantially coated food product is removed from an enrob-ing/tumbling device. A coated food product is preferably removed from a preparation area when a temperature of at most about 5 degrees below a melting point of said slurry coating is achieved. Close adherence to the temperature parameters of this step in the process assures the fat-based slurry is properly set. The setting of the fat-based slurry reduces stickiness, which can lead to bridging or blocking between individual coated snack pieces. A slurry coating is set when a slurry coating changes from a liquid to a solid or semi-solid. Setting temperatures of a slurry coating of the invention are well known by one of ordinary skill in the art.

Various example methods can comprise a packaging step. For example, the packaging step can be practiced by providing a quantity of the coated finished products or blends comprising the coated products as components, especially principal components, thereof within a bag or pouch fabricated from a flexible packaging film and sealing a pouch to form a finished package snack food article. The bags can be of individual serving sizes or portions (e.g., 30-100 g) or can be of larger quantities for multiples servings in a single bag or other container. For additional protection against breakage during distribution and sale, the bag can itself be disposed within a more robust exterior protective container such as a carton or box. The various products described herein may also be stored in disposable hinged containers, such as a "clam shell" plastic container. An example coated food product also holds up when stored in 450 lb totes before individual packaging to provide flexibility in plant packaging options.

Various example embodiments of coated food products described herein exhibit improved resistance to melting and blocking in the food package during distribution and sale and in particular exhibit such improved shipping abuse tolerance during high temperatures experienced during transit especially in southern locations and/or during summer months. Moreover, the coatings can provide improvements in preventing oiling out, fat bloom, and other physical challenges that occur at abusive temperatures that can occur when compound fat based coatings are employed.

While the invention has been described in connection with what is considered to be the most practical embodiments, it is to be understood that the invention is not to be limited to the disclosed embodiments, but on the contrary, is intended to cover various modifications and equivalent arrangements included within the spirit and scope of the appended claims. It should be understood that variations of the example embodiments described herein incorporating the principles of the invention will occur to those of ordinary skill in the art and yet will be within the scope of the appended claims.

What is claimed is:

1. A method of preparing a coated food product including individual coated snack pieces comprising the steps of:
   A. providing individual product base pieces;
   B. applying a slurry coating to an exterior surface of said product base pieces; and
   C. applying a dry set coating to said product base pieces thereby providing a substantially coated food product including individual coated snack pieces,
   wherein said dry set coating comprises both a dry set material having a particle size of 500 micrometers or less and particulates having a particle size of greater than 500 micrometers to about 5000 micrometers, and
   wherein a weight ratio of the product base pieces to the slurry coating is between 1:1 and 1.25:1 and a weight ratio of the product base pieces to the dry set coating is at least 2:1 and wherein the slurry coating is configured to reduce stickiness and reduce bridging between the individual coated snack pieces.

2. The method as in claim 1, further comprising the step of:
   D. removing said substantially coated food product from an enrobing/tumbling device when the substantially coated food product has a temperature of at most about 5 degrees fahrenheit below a melting point of said slurry coating.

3. The method as in claim 1, wherein said slurry coating is applied in a rotating drum assembly with a coating mechanism, said product base pieces being tumbled in said drum assembly with said coating mechanism, and said slurry coating being sprayed from at least one nozzle.

4. The method of claim 1, wherein said slurry coating consists of ingredients selected from a group consisting of sugar, fractionated palm kernel oil, nonfat dry milk, soy lecithin, natural flavors and artificial flavors.

5. The method as in claim 1, wherein said dry set coating comprises between about 10% to about 25% by weight of said substantially coated food product.

6. The method of claim 1, wherein said product base is between about 60 degrees fahrenheit and about 80 degrees fahrenheit when said slurry coating is applied to said product base.

7. The method of claim 1, wherein said product base pieces comprises at least 30% to about 55% by weight of said substantially coated food product.

8. The method of claim 1, wherein said slurry coating covers at least 50% of an exterior surface of each of said product base pieces, thereby providing a substantially homogenous appearance.

9. The method of claim 1, wherein said slurry coating is applied at least about 5 degrees above a melting point of said slurry coating.

10. The method of claim 1, wherein said coated food product comprises a preservative, where in the preservative is selected from a group consisting of tert-Butylhydroquinone (TBHQ), butylated hydroxytoluene (BHT), Butylated hydroxyanisole (BHA), calcium propionate, sodium nitrate, sodium nitrite, sulfur dioxide, sodium bisulfite, potassium hydrogen sulfite and disodium EDTA.

11. The method of claim 1, wherein said dry set material is selected from a group consisting of confectioner's sugar, fructose, sucrose, glucose, Shugarwhite, dextrose, Baker's Special Sugar and seasoning blends.

12. The method of claim 1, wherein 90% of said dry set material is less than 100 micrometers.

13. The method of claim 1, wherein said dry set coating comprises between 10% to about 25% dry set material.

14. The method of claim 1, wherein said dry set coating comprises between 1% to about 25% particulates.

15. The method of claim 1, wherein said particulates are selected from a group consisting of cookies, wafers, biscuits, candies, seasoning, sprinkles, nut, toffee, color seasonnettes and crackers.

16. The method of claim 1, wherein 95% of said particulates are greater than 500 micrometers and less than 4000 micrometers.

17. The method of claim 1, wherein the dry set coating is applied with said dry set material comprising at least 35% by weight of said dry set coating and said particulates comprising less than 35% by weight of said dry set coating.

18. The method of claim 1, wherein the weight ratio of product base to slurry to dry set coating is between 2:2:1 and 2.5:2:1.

19. The method of claim 11, wherein the dry set material consists of fructose, sucrose, glucose, dextrose or combinations thereof.

20. The method of claim 12, wherein the dry set material comprises between 10 to 25% by weight of the substantially coated food product.

21. The method of claim 20, wherein the particulates comprise between 1 to 25% by weight of the substantially coated food product.

22. The method of claim 21, wherein 50% of the particulates are between 1000 and 2000 micrometers.

* * * * *